(12) United States Patent
Scott et al.

(10) Patent No.: US 6,698,849 B1
(45) Date of Patent: Mar. 2, 2004

(54) PNEUMATIC PRESSURE CONTROL DEVICE FOR AN EMPTY/LOAD CHANGEOVER VALVE ON A RAILWAY CAR

(75) Inventors: Daniel G. Scott, Pittsburgh, PA (US); John B. Carroll, Irwin, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/716,611

(22) Filed: Nov. 20, 2000

(51) Int. Cl.[7] .................................................. B60T 8/18
(52) U.S. Cl. ...................................... 303/22.7; 303/9.69
(58) Field of Search ........................... 303/9.69, 22.1, 303/22.3, 22.2, 22.5, 22.6, 22.7, 22.8

(56) References Cited

U.S. PATENT DOCUMENTS

| | | | | |
|---|---|---|---|---|
| 430,024 A | * | 6/1890 | Hopper | 303/22.8 |
| 3,408,118 A | * | 10/1968 | Asand et al. | 303/22.7 |
| 5,106,168 A | * | 4/1992 | McKay | 303/22.7 |
| 5,211,450 A | * | 5/1993 | Gayfer et al. | 303/22.8 |
| 6,027,180 A | * | 2/2000 | Greenaway et al. | 303/22.3 |

* cited by examiner

Primary Examiner—Matthew C. Graham
(74) Attorney, Agent, or Firm—James Ray & Associates

(57) ABSTRACT

A pneumatic pressure control device for an empty/load changeover valve on a railway car, which enables an empty/load changeover valve to have a lower profile. The pneumatic pressure control device comprises a mounting member having a first surface, a second surface, and further having an actuating push rod. A sensor arm of a predetermined size and shape has a first end and a second end. A first disposed adjacent at least one of the first surface and the second surface of the mounting member pivotally supports the sensor arm in a predetermined position on the mounting member. A second is engageable with the sensor arm and the actuating push rod on the mounting member for moving the push rod in response to a movement of the sensor arm. A load sensing has at least a portion thereof disposed on the second end of the sensor arm for determining a rate of brake cylinder pressure required relative to an actual weight of a railway car. The sensor arm and the load sensing have a predetermined travel limit.

28 Claims, 4 Drawing Sheets

PNEUMATIC PRESSURE CONTROL DEVICE FOR AN EMPTY/LOAD CHANGEOVER VALVE ON A RAILWAY CAR

FIELD OF THE INVENTION

The present invention relates, in general, to a pneumatic pressure control device for an empty/load type brake control system on a railway car, and more particularly, to a pneumatic pressure control device having a lower profile for an empty/load changeover valve on a railway car.

BACKGROUND OF THE INVENTION

Prior to the present invention, an empty/load changeover valve for a railway car is typically mounted on the underside of the railway car, between the car body and the top of a horizontal surface of a railway car truck, such as a side frame. The pneumatic pressure control portion of the valve comprises a sensor arm pivot, which is located on the top of the valve. One end of a sensor arm is attached to the pivot. A sensing means is attached to the other end of the sensor arm. The sensing means is disposed on a railway car member, usually the railway car side frame, under all load conditions. An attachment disposed on the sensor arm is engageable with an actuating push rod on the empty/load changeover valve for moving the push rod in response to the sensor arm. This arrangement requires a minimum clearance of about 10½ inches for proper installation and operation. Conditions that can decrease the clearance and affect the proper operation of the pneumatic pressure control device include worn truck side frame springs, or a railway car designed with truck side frame springs having a softer spring rate. Sufficient clearance requirements can also be affected by the car design and construction. If minimum clearance requirements are not maintained, the valve body can also get crushed between the railway car and the truck side frame, adversely affecting its operation.

An example of this type handbrake is taught in U.S. Pat. Nos. 5,005,915, and 5,100,207. The teachings of these references are incorporated herein by reference thereto.

SUMMARY OF THE INVENTION

In a first aspect, the present invention provides a pneumatic pressure control device for an empty/load changeover valve on a railway car, which enables an empty/load changeover valve to have a lower profile. The pneumatic pressure control devise comprises a mounting member having a first surface, a second surface, and further having an actuating push rod. A sensor arm of a predetermined size and shape has a first end and a second end. A first means is disposed adjacent at least one of the first surface and the second surface of the mounting member for pivotally supporting the sensor arm in a predetermined position on the mounting member. A second means is engageable with the sensor arm and the actuating push rod on the mounting member for moving the push rod in response to a movement of the sensor arm. A load sensing means has at least a portion thereof disposed on the second end of the sensor arm for determining a level of brake cylinder pressure required relative to an actual weight of the railway car. The sensor arm and the load sensing means have a predetermined travel limit.

In a further aspect, the present invention provides a pneumatic pressure control device for an empty/load changeover valve on a railway car, which enables an empty/load changeover valve to have a lower profile. The pneumatic pressure control devise comprises a mounting member engageable with a valve adjacent one end thereof having a first surface, a second surface, and further having an actuating push rod. A sensor arm of a predetermined size and shape has a first end and a second end. A first means is engageable with a bottom surface of a railway car for pivotally supporting the sensor arm in a predetermined position on a railway car. A second means is engageable with the sensor arm and the actuating push rod on the mounting member for moving the push rod in response to a movement of the sensor arm. A load sensing means has at least a portion thereof disposed on the second end of the sensor arm for determining a rate of brake cylinder pressure required relative to an actual weight of the railway car. The sensor arm and the load sensing means have a predetermined travel limit.

In still a further aspect, the present invention provides a pneumatic pressure control device for an empty/load changeover valve on a railway car, which enables an empty/load changeover valve to have a lower profile. The pneumatic pressure control device comprises a mounting member engageable with a valve adjacent one end thereof having a first surface and a second surface, and further having an actuating push rod. A sensor arm of a predetermined size and shape has a first end and a second end. A first means pivotally supports the sensor arm in a predetermined position on a railway car. A second means is engageable with the first end of the sensor arm and the actuating push rod on the mounting member for moving the push rod in response to a movement of the senor arm. A load sensing means has at least a portion thereof disposed on the second end of the sensor arm for determining a level of brake cylinder pressure required relative to an actual weight of a railway car. The sensor arm and the load sensing means have a predetermined travel limit.

SUMMARY OF THE INVENTION

It is therefore a primary object of the present invention to provide a pneumatic pressure control device for an empty/load changeover valve to enable the empty/load changeover valve to have a lower profile. A lower profile will allow the pneumatic pressure control device to operate in low clearance situations while minimizing the risk of potential damage to the valve.

Another object of the invention is to provide a means for mounting the device in alternate positions on a railway car to minimize or prevent damage to a valve that is typically mounted between a railway car body and a railway car truck.

In addition to the various objects of the invention that have been described above, various other objects and advantages of the invention will become more readily apparent to those persons skilled in the relevant art from the following more detailed description of the invention, particularly, when such description is taken in conjunction with the attached drawing figures and the appended claims.

BRIEF DESCRIPTION OF A PRESENTLY PREFERRED AND

VARIOUS ALTERNATIVE EMBODIMENTS OF THE PRESENT INVENTION

Figure 1:
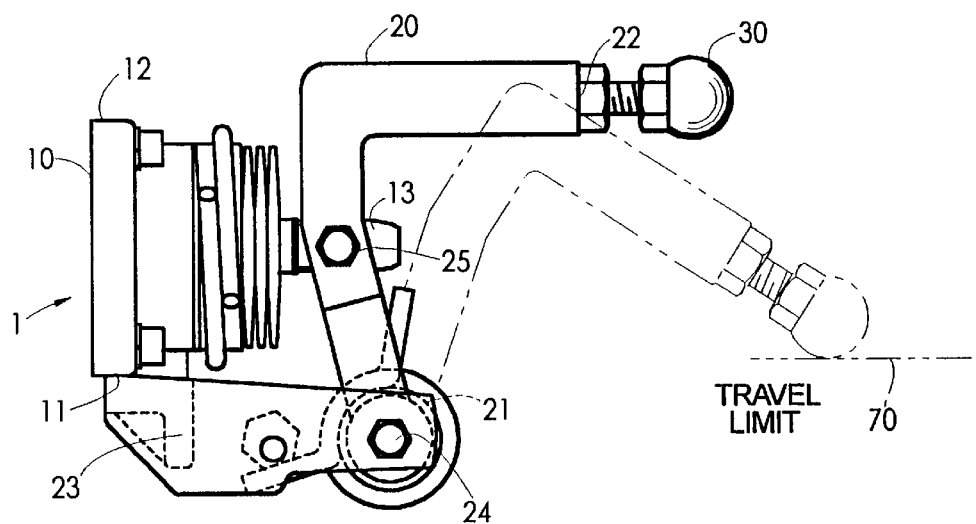
FIG. 1 is an elevation view of the pneumatic pressure control device.

Prior to proceeding to a more detailed description of the invention, it should be noted that identical components having identical functions have been designated with identical reference numerals for the sake of clarity.

Figure 2:
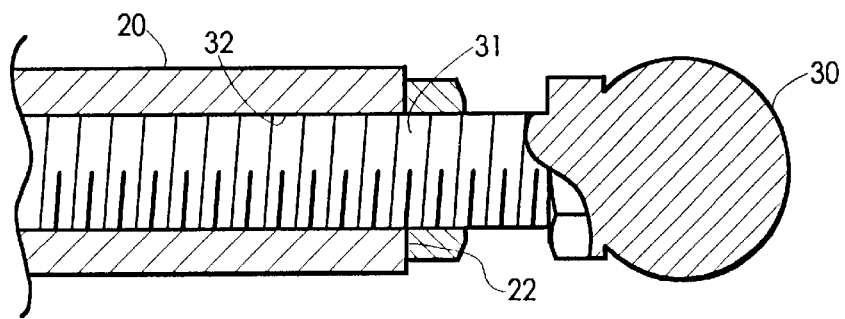
FIG. 2 is an enlarged sectional view of a portion of the pneumatic pressure control device.
Figure 2A:
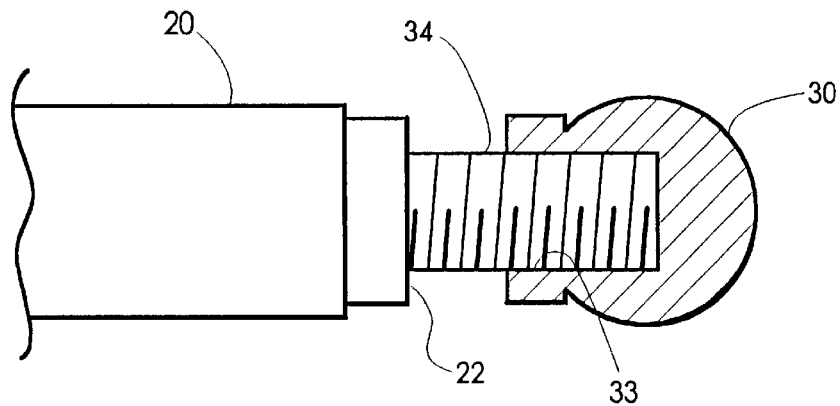
FIG. 2A is an enlarged sectional view of a portion of the pneumatic pressure control device illustrating an alternate configuration of the device.

Now refer more particularly to FIGS. 1, 2, and 2A of the drawings. Illustrated therein is a pneumatic pressure control device, generally designated 1, for an empty/load changeover valve (not shown) on a railway car (not shown), which enables an empty/load changeover valve to have a lower profile. The pneumatic pressure control device comprises a mounting member 10 having a first surface 11 and a second surface 12. The mounting member 10 further has an actuating push rod 13. A sensor arm 20 of a predetermined size and shape has a first end 21 and a second end 22. Preferably, the sensor arm 20 is substantially an elbow with a predetermined angle. A first means 23 disposed at least one of the first surface 11 and the second surface 12 of the mounting member 10 pivotally supports the sensor arm 20 in a predetermined position on the mounting member 10. Preferably, the first means 23 includes a member of a predetermined size and shape disposed on at least one of the first surface 11 and the second surface 12 of the mounting member 10, and the first end 21 of the sensor arm 20 is attached to the first means 23 by a bolt 24 of a predetermined length and diameter. A second means 25 is engageable with the sensor arm 20 and the actuating push rod 13 on the mounting member 10 for moving the push rod 13 in response to a movement of the sensor arm 20. Preferably, the second means 25 includes a bolt of a predetermined length and diameter. A load sensing means 30 has at least a portion thereof disposed on the second end 22 of the sensor arm 20 for determining the rate of brake cylinder pressure required relative to the actual weight of a railway car. Preferably, the load sensing means 30 is a substantially spherically shaped element of a predetermined size, and is adjustable by being attached to a threaded shaft 31 of a predetermined length and diameter disposed within a threaded bore 32 of a predetermined depth and diameter on the second end 22 of the sensor arm 20. Alternately, it is obvious that the load sensing means 30 can also have a threaded bore 33 of a predetermined depth and diameter disposed on a threaded shaft 34 attached to the second end 22 of the sensor arm 20. The preferred spherically shaped element is a stylus. The sensor arm 20 and the load sensing means 30 have a predetermined travel limit 70. The preferred travel limit 70 is at least a minimum distance of about 4.50 inches.

Figure 3:
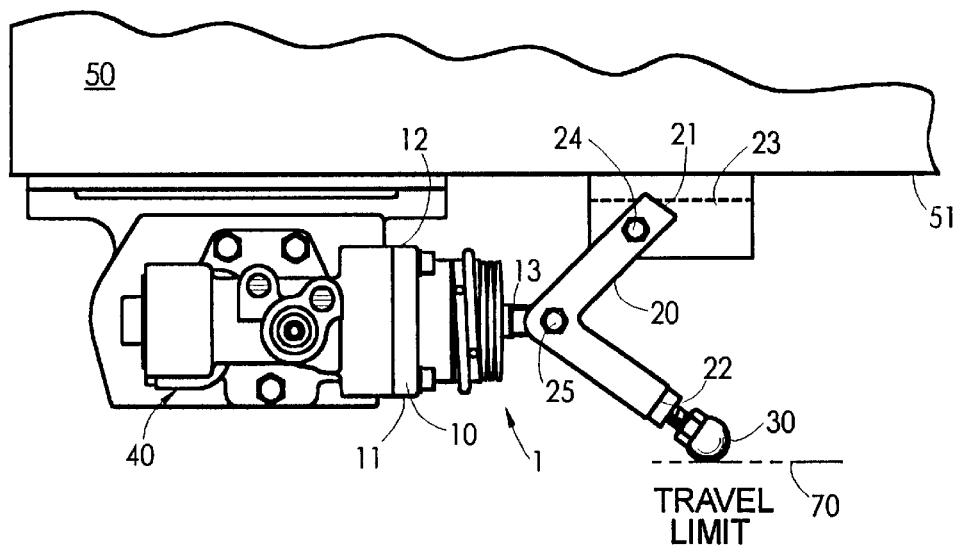
FIG. 3 is an elevation view of an alternate configuration of the pneumatic pressure control device.

Now refer more particularly to FIGS. 2, 2A, and 3 of the drawings. Illustrated therein is a pneumatic pressure control device, generally designated 1, for an empty/load changeover valve 40 on a railway car 50, which enables an empty/load changeover valve 40 to have a lower profile. The internal porting of the empty/load changeover valve 40 is modified by reversing the sensing logic. The pneumatic pressure control device comprises a mounting member 10 engageable with an empty/load changeover valve 40 adjacent one end thereof, having a first surface 11 and a second surface 12. The mounting member 10 further has an actuating push rod 13. A sensor arm 20 of a predetermined size and shape has a first end 21 and a second end 22. Preferably, the sensor arm 20 is substantially an elbow with a predetermined angle. A first means 23 is engageable with a bottom surface 51 of a railway car 50 for pivotally supporting the first end 21 of sensor arm 20 in a predetermined position on a railway car 50. Preferably, the first means 23 includes a member of a predetermined size and shape for disposition on a bottom surface of a railway car 50, and the first end 22 of the sensor arm 20 is attached to the first means 23 by a bolt of a predetermined length and diameter. A second means 25 is engageable with the sensor arm 20 and the actuating push rod 13 on the mounting member 10 for moving the push rod 13 in response to a movement of the sensor arm 20. Preferably, the second means 25 is a bolt of a predetermined length and diameter. A load sensing means 30 has at least a portion thereof disposed on the second end 22 of the sensor arm 20 for determining the rate of brake cylinder pressure required relative to the actual weight of a railway car. A load sensing means 30 has at least a portion thereof disposed on the second end 22 of the sensor arm 20 for determining the rate of brake cylinder pressure required relative to the actual weight of a railway car. Preferably, the load sensing means 30 is a substantially spherically shaped element of a predetermined size, and is adjustable by being attached to a threaded shaft 31 of a predetermined length and diameter disposed within a threaded bore 32 of a predetermined depth and diameter on the second end 22 of the sensor arm 20. Alternately, it is obvious that the load sensing means 30 can also have a threaded bore 33 of a predetermined depth and diameter disposed on a threaded shaft 34 attached to the second end 22 of the sensor arm 20. The preferred spherically shaped element is a stylus. The sensor arm 20 and the load sensing means 30 have a predetermined travel limit 70.

Figure 4:
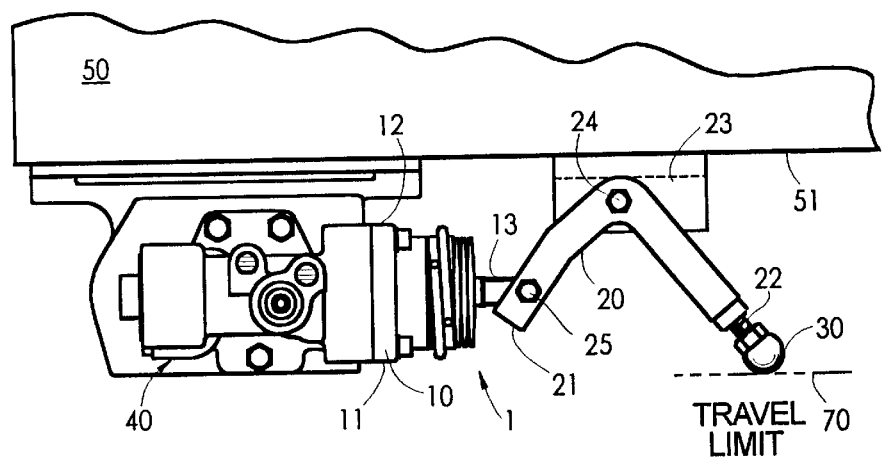
FIG. 4 is an elevation view of another alternate configuration of the pneumatic pressure control device.

Now refer again more particularly to FIGS. 2, 2A, and 4 of the drawings. Illustrated therein is a pneumatic pressure control device, generally designated 1, for an empty/load changeover valve 40 on a railway car 50, which enables an empty/load changeover valve 40 to have a lower profile. The internal porting of the empty/load changeover valve 40 is modified by reversing the sensing logic. The pneumatic pressure control device comprises a mounting member 10 engageable with an empty/load changeover valve 40 adjacent one end thereof, having a first surface 11 and a second surface 12. The mounting member 10 further has an actuating push rod 13. A sensor arm 20 of a predetermined size and shape has a first end 21 and a second end 22. Preferably, the sensor arm 20 is substantially an elbow with a predetermined angle. A first means 23 pivotally supports the sensor arm 20 in a predetermined position on a railway car 50. Preferably, the first means 23 includes a member of a predetermined size and shape for disposition on a bottom surface of a railway car 50, and the first means 23 is attached to the sensor arm 20 by a bolt 24 of a predetermined length and diameter. A second means 25 is engageable with the first end 21 of the sensor arm 20 and the actuating push rod 13 on the mounting member 10 for moving the push rod 13 in response to a movement of the sensor arm. Preferably, the second means 25 is a bolt of a predetermined length and diameter. A load sensing means 30 has at least a portion thereof disposed on the second end 22 of the sensor arm 20 for determining the rate of brake cylinder pressure required relative to the actual weight of the railway car. Preferably, the load sensing means 30 is a substantially spherically shaped element of a predetermined size, and is adjustable by being attached to a threaded shaft 31 of a predetermined length and diameter disposed within a threaded bore 32 of a predetermined depth and diameter on the second end 22 if the sensor arm 20. Alternately, it is obvious that the load sensing means 30 can also have a threaded bore 33 of a predetermined depth and diameter disposed on a threaded shaft 34 attached to the second end 22 of the sensor arm 20. The preferred spherically shaped element is a stylus. The sensor arm 20 and the load sensing means 30 have travel limit 70 of a predetermined minimum distance.

Figure 5:
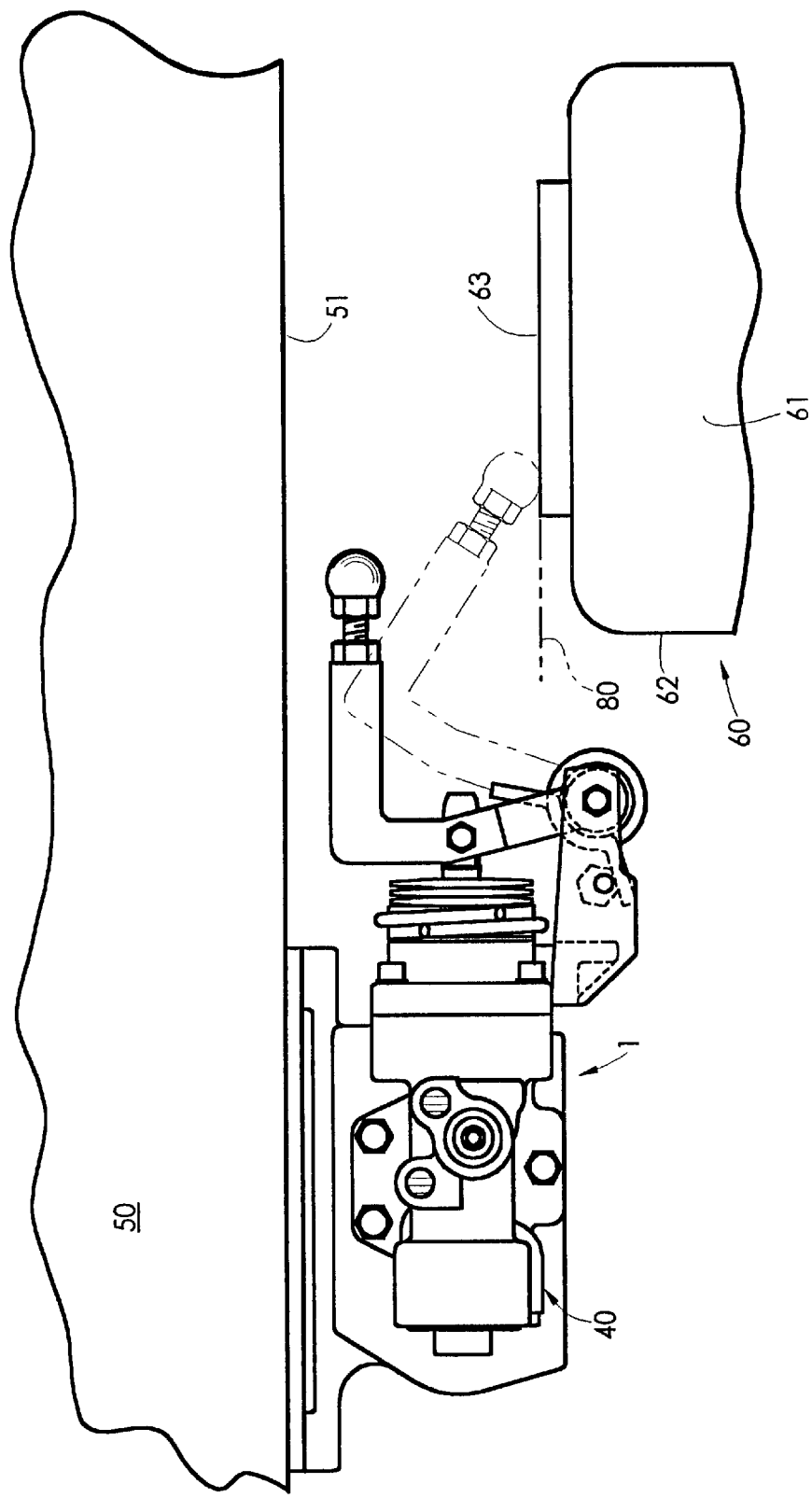
FIG. 5 is an elevation view of the pneumatic pressure control device in combination with an empty/load changeover valve on a railway car.

Now refer more particularly to FIG. 5 of the drawings. Illustrated therein is a pneumatic pressure control device, generally designated 1, in combination with an empty/load changeover valve 40 for use on a railway car 50. The railway car 50 has a bottom surface 51. A truck, generally designated 60, has a side frame 61 with an outside vertical wall 62 and a top horizontal surface 63. The empty/load changeover valve 40 in combination with the pneumatic pressure control device 1 is disposed intermediate the bottom surface 51 of the railway car 50 and the top horizontal surface 63 of the side frame 61, and has a predetermined mounting height 80 between the bottom surface 51 of the railway car 50 and the top horizontal surface 63 of the side frame 61. The preferred mounting height 80 is between about 4.50 inches and about 5.50 inches. The empty/load changeover valve 40 in combination with the pneumatic pressure control device 1 is located outside the vertical surface 62 of the side frame 61 in a predetermined position on the railway car 50. Preferably, the predetermined position is perpendicular to the outside vertical wall 62 of the side frame 60.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. A pneumatic pressure control device for an empty/load changeover valve on a railway car, which enables such empty/load changeover valve to have a lower profile, said pneumatic pressure control device comprising:
    (a) a mounting member disposed at one end of said empty/load changeover valve, said mounting member having a lower first surface and an upper second surface and further having an actuating push rod horizontally disposed for reciprocal movement therethrough;
    (b) a sensor arm of a predetermined size and shape having a first end and a second end;
    (c) a first means disposed adjacent at least one of said first surface and said second surface of said mounting member for pivotally supporting said sensor arm in a predetermined position;
    (d) a second means engageable with said sensor arm and said actuating push rod on said mounting member for moving said push rod in response to a movement of said sensor arm;
    (e) a load sensing means threadedly engaged into said second end of said sensor arm along a longitudinal axis of said sensor arm adjacent said second end for determining a rate of brake cylinder pressure required relative to an actual weight of such railway car; and
    (f) a predetermined travel limit of said sensor arm and said load sensing means.

2. The pneumatic pressure control device according to claim 1 wherein said sensor arm is substantially an elbow with a predetermined angle.

3. The pneumatic pressure control device according to claim 1 wherein said first means includes a member of a predetermined size and shape disposed on at least one of said first surface and said second surface of said mounting member.

4. The pneumatic pressure control device according to claim 1 wherein said first end of said sensor arm is attached to said first means by a bolt of a predetermined length and diameter.

5. The pneumatic pressure control device according to claim 1 wherein said second means includes a bolt of a predetermined length and diameter.

6. The pneumatic pressure control device according to claim 1 wherein said load sensing means is attached to a threaded shaft of a predetermined length and diameter disposed within a threaded bore of a predetermined depth and diameter on said second end of said sensor arm.

7. The pneumatic pressure control device according to claim 6 wherein said load sensing means is adjustable.

8. The pneumatic pressure control device according to claim 1 wherein said load sensing means is a substantially spherically shaped element of a predetermined size.

9. The pneumatic pressure control device according to claim 8 wherein said spherically shaped element is a stylus.

10. The pneumatic pressure control device according to claim 1 wherein said predetermined travel limit of said sensor arm and said load sensing means is at least a minimum distance of about 4.50 inches.

11. A pneumatic pressure control device for an empty/load changeover Valve on a railway car, which enables such empty/load changeover valve to have a lower profile, said pneumatic pressure control device comprising:
    (a) a mounting member engageable with such valve adjacent one end thereof having a first surface and a second surface and further having an actuating push rod;
    (b) a sensor arm of a predetermined size and shape having a first end and a second end;
    (c) a first means engageable with a bottom surface of such railway car for pivotally supporting said first end of said sensor arm in a predetermined position on such railway car;
    (d) a second means engageable with said sensor arm and said actuating push rod on said mounting member for moving said push rod in response to a movement of said sensor arm;
    (e) a load sensing means having at least a portion thereof disposed on said second end of said sensor arm along a longitudinal axis of said sensor arm adjacent said second end for determining a rate of brake cylinder pressure required relative to an actual weight of such railway car; and
    (f) a predetermined travel limit of said sensor arm and said load sensing means.

12. The pneumatic pressure control device according to claim 11 wherein said sensor arm is substantially an elbow shape with a predetermined angle.

13. The pneumatic pressure control device according to claim 11 wherein said first means includes a member of a predetermined size and shape for disposition on such bottom surface of such railway car.

14. The pneumatic pressure control device according to claim 11 wherein said first end of said sensor arm is attached to said first means by a bolt of a predetermined length and diameter.

15. The pneumatic pressure control device according to claim 11 wherein said second means includes a bolt of a predetermined length and diameter.

16. The pneumatic pressure control device according to claim 11 wherein said load sensing means is attached to a threaded shaft of a predetermined length and diameter disposed within a threaded bore of a predetermined depth and diameter on said second end of said sensor arm.

17. The pneumatic pressure control device according to claim 16 wherein said load sensing means is adjustable.

18. The pneumatic pressure control device according to claim 11 wherein said load sensing means is a substantially spherically shaped element of a predetermined size.

19. The pneumatic pressure control device according to claim 18 wherein said spherically shaped element is a stylus.

20. A pneumatic pressure control device for an empty/load changeover valve on a railway car, which enables such empty/load changeover valve to have a lower profile, said pneumatic pressure control device comprising:

(a) a mounting member engageable with such valve adjacent one end thereof having a first surface and a second surface and further having an actuating push rod;

(b) a sensor arm of a predetermined size and shape having a first end and a second end;

(c) a first means for pivotally supporting said sensor arm in a predetermined position on such railway car;

(d) a second means engageable with said first end of said sensor arm and said actuating push rod on said mounting member for moving said push rod in response to a movement of said sensor arm;

(e) a load sensing means having at least a portion thereof disposed on said second end of said sensor arm along a longitudinal axis of said sensor arm adjacent said second end for determining a rate of brake cylinder pressure required relative to an actual weight of such railway car; and (f) a predetermined travel limit of said sensor arm and said load sensing means.

21. The pneumatic pressure control device according to claim 20 wherein said sensor arm is substantially an elbow with a predetermined angle.

22. The pneumatic pressure control device according to claim 20 wherein said first means includes a member of a predetermined size and shape for disposition on a bottom surface of such railway car.

23. The pneumatic pressure control device according to claim 20 wherein said sensor arm is attached to said first means by a bolt of a predetermined length and diameter.

24. The pneumatic pressure control device according to claim 20 wherein said second means is a bolt of a predetermined length and diameter.

25. The pneumatic pressure control device according to claim 20 wherein said load sensing means is attached to a threaded shaft of a predetermined length and diameter disposed within a threaded bore of a predetermined depth and diameter on said second end of said sensor arm.

26. The pneumatic pressure control device according to claim 25 wherein said load sensing means is adjustable.

27. The pneumatic pressure control device according to claim 20 wherein said load sensing means is a substantially spherically shaped element of a predetermined size.

28. The pneumatic pressure control device according to claim 27 wherein said spherically shaped element is a stylus.

\* \* \* \* \*